(12) United States Patent
Matsuda et al.

(10) Patent No.: US 9,647,597 B2
(45) Date of Patent: May 9, 2017

(54) MOTOR CONTROL APPARATUS AND METHOD FOR CONTROLLING MOTOR

(71) Applicant: KABUSHIKI KAISHA YASKAWA DENKI, Kitakyushu-shi (JP)

(72) Inventors: Shuji Matsuda, Kitakyushu (JP); Hideaki Iura, Kitakyushu (JP)

(73) Assignee: KABUSHIKI KAISHA YASKAWA DENKI, Kitakyushu-Shi (JP)

(\*) Notice: Subject to any disclaimer, the term of this patent is extended or adjusted under 35 U.S.C. 154(b) by 77 days.

(21) Appl. No.: 14/521,619

(22) Filed: Oct. 23, 2014

(65) Prior Publication Data
US 2015/0115865 A1 Apr. 30, 2015

(30) Foreign Application Priority Data
Oct. 31, 2013 (JP) ................................ 2013-227143

(51) Int. Cl.
*H02P 23/00* (2016.01)
*H02J 3/18* (2006.01)
(Continued)

(52) U.S. Cl.
CPC .............. *H02P 27/06* (2013.01); *H02P 1/029* (2013.01); *H02P 23/28* (2016.02)

(58) Field of Classification Search
CPC ............................ H02M 3/158; H02M 3/1588
(Continued)

(56) References Cited

U.S. PATENT DOCUMENTS 4,451,112 A \* 5/1984 Hattori ...................... H02P 1/30
318/778
4,475,631 A \* 10/1984 Nomura .................... H02P 3/18
187/296
(Continued)

FOREIGN PATENT DOCUMENTS

EP 0177114 4/1986
JP 60-087697 5/1985
(Continued)

OTHER PUBLICATIONS

Japanese Office Action for corresponding JP Application No. 2013-227143, Aug. 18, 2015.
(Continued)

*Primary Examiner* — Eduardo Colon Santana
*Assistant Examiner* — Devon Joseph
(74) *Attorney, Agent, or Firm* — Mori & Ward, LLP

(57) ABSTRACT

A motor control apparatus includes a voltage regulator to execute a voltage increase mode to increase a voltage applied to an induction motor from a lower limit of a first range over time. A frequency regulator executes a frequency decrease mode to decrease a frequency of the voltage from an upper limit of a second range over time. The frequency regulator limits decrease of the frequency when a bus voltage of a bus exceeds a first threshold in the frequency decrease mode. The bus supplies DC power to an inverter to drive the motor. A mode changer alternatively changes the voltage increase mode and the frequency decrease mode to control the motor to change from a free running state to a state in which the voltage and the frequency satisfy a relationship. The determinator determines whether the voltage and the frequency satisfy the relationship.

19 Claims, 11 Drawing Sheets

(51) Int. Cl.
*H02P 27/06* (2006.01)
*H02P 1/02* (2006.01)
*H02P 23/28* (2016.01)

(58) Field of Classification Search
USPC .......................................................... 318/808
See application file for complete search history.

(56) References Cited

U.S. PATENT DOCUMENTS

| | | | |
|---|---|---|---|
| 4,607,205 A * | 8/1986 | Kito | H02M 7/53875 318/778 |
| 5,089,760 A * | 2/1992 | Joyner, Jr. | H02P 23/06 318/798 |
| 8,159,202 B2 * | 4/2012 | Boling | H02M 3/156 323/267 |
| 8,232,788 B2 * | 7/2012 | Boling | G11B 5/09 323/267 |
| 2004/0125623 A1 * | 7/2004 | Sankman | H02M 3/00 363/41 |
| 2010/0148710 A1 * | 6/2010 | Lim | H02P 6/20 318/400.11 |
| 2010/0320975 A1 * | 12/2010 | Boling | H02M 3/156 323/267 |
| 2010/0320987 A1 * | 12/2010 | Boling | G11B 5/09 323/284 |
| 2014/0338379 A1 * | 11/2014 | Hatakeyama | F25B 30/02 62/126 |

FOREIGN PATENT DOCUMENTS

| | | |
|---|---|---|
| JP | 61-196794 | 8/1986 |
| JP | 06-189572 | 7/1994 |
| JP | 09-009661 | 1/1997 |
| JP | 2004-048840 | 2/2004 |

OTHER PUBLICATIONS

Extended European Search Report for corresponding EP Application No. 14188751.3-1806, Apr. 10, 2015.
Chinese Office Action for corresponding CN Application No. 201410475511.9, Oct. 9, 2016.

* cited by examiner

MOTOR CONTROL APPARATUS AND METHOD FOR CONTROLLING MOTOR

CROSS-REFERENCE TO RELATED APPLICATIONS

The present application claims priority under 35 U.S.C. §119 to Japanese Patent Application No. 2013-227143, filed Oct. 31, 2013. The contents of this application are incorporated herein by reference in their entirety.

BACKGROUND

Field of the Invention

The present invention relates to a motor control apparatus and a method for controlling a motor.

Discussion of the Background

Japanese Unexamined Patent Application Publication No. 2004-48840 discloses control for transition to V/F control. In the transition control, mode 0 is executed to increase output voltage of an inverter while maintaining an output frequency of the inverter at a fixed value. When output current of the inverter reaches a limit value, mode 0 is changed to mode 1, in which the output frequency of the inverter is increased while the output voltage of the inverter is maintained at a fixed value.

SUMMARY

According to one aspect of the present disclosure, a motor control apparatus includes a voltage regulator, a frequency regulator, a mode changer, and a determinator. The voltage regulator is configured to execute a voltage increase mode to increase a voltage applied to an induction motor from a lower limit of a first predetermined range over time. The frequency regulator is configured to execute a frequency decrease mode to decrease a frequency of the applied voltage from an upper limit of a second predetermined range over time. The frequency regulator is configured to limit decrease of the frequency when a bus voltage of a bus exceeds a first threshold in the frequency decrease mode. The bus supplies DC power to an inverter to drive the induction motor. The mode changer is configured to alternatively change the voltage increase mode and the frequency decrease mode so as to control the induction motor to change from a free running state to a state in which the applied voltage and the frequency satisfy a predetermined relationship. The determinator is configured to determine whether the applied voltage and the frequency satisfy the predetermined relationship.

According to another aspect of the present disclosure, a method for controlling a motor includes alternatively changing a voltage increase mode and a frequency decrease mode. The voltage increase mode is for increasing a voltage applied to an induction motor from a lower limit of a predetermined range over time. The frequency decrease mode is for decreasing a frequency of the applied voltage from an upper limit of a predetermined range over time. When a bus voltage of a bus exceeds a first threshold in the frequency decrease mode, decrease of the frequency is limited so as to control the induction motor to change from a free running state to a state in which the applied voltage and the frequency satisfy a predetermined relationship. The bus supplies DC power to an inverter to drive the induction motor. Whether the applied voltage and the frequency satisfy the predetermined relationship is determined.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
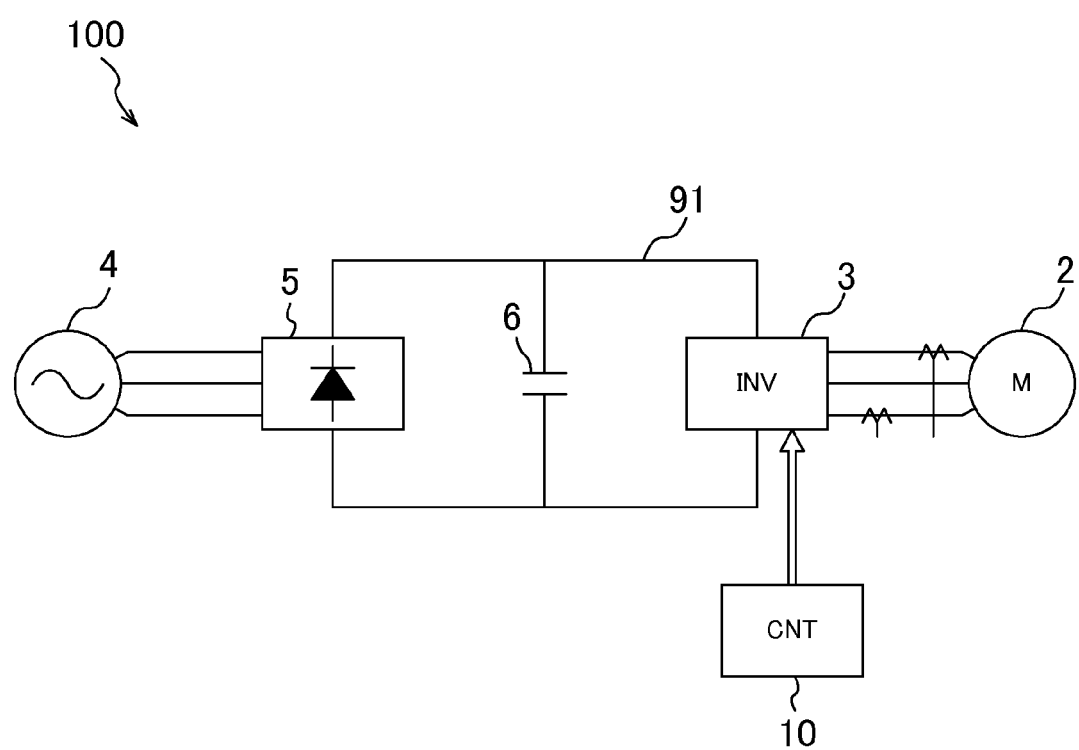
FIG. 1 is a block diagram illustrating an exemplary configuration of a motor control system.

The embodiments will now be described in detail with reference to the accompanying drawings, wherein like reference numerals designate corresponding or identical elements throughout the various drawings.

FIG. 1 is a block diagram illustrating an exemplary configuration of a motor control system 100. The motor control system 100 includes an induction motor 2, an inverter 3, an AC (alternating-current) power source 4, a rectifier circuit 5, a smoothing capacitor 6, and a motor control apparatus 10.

The inverter 3 includes, for example, a three-phase bridge circuit. Based on a control signal generated by the motor control apparatus 10, the inverter 3 converts DC (direct-current) power supplied from the rectifier circuit 5 and the smoothing capacitor 6 into AC power, and outputs the converted AC power to the induction motor 2.

The rectifier circuit 5 and the smoothing capacitor 6 convert AC power supplied from the AC power source 4 into DC power, and output the converted DC power to the inverter 3. A voltage is applied to the smoothing capacitor 6 and represents a bus voltage of a bus 91, through which DC power is supplied to the inverter 3.

The motor control apparatus 10 includes, for example, a Micro-Processing Unit (MPU). The motor control apparatus 10 performs information processing in accordance with a program to generate a control signal to control rotation of the induction motor 2, and to output the control signal to the inverter 3.

Figure 2:
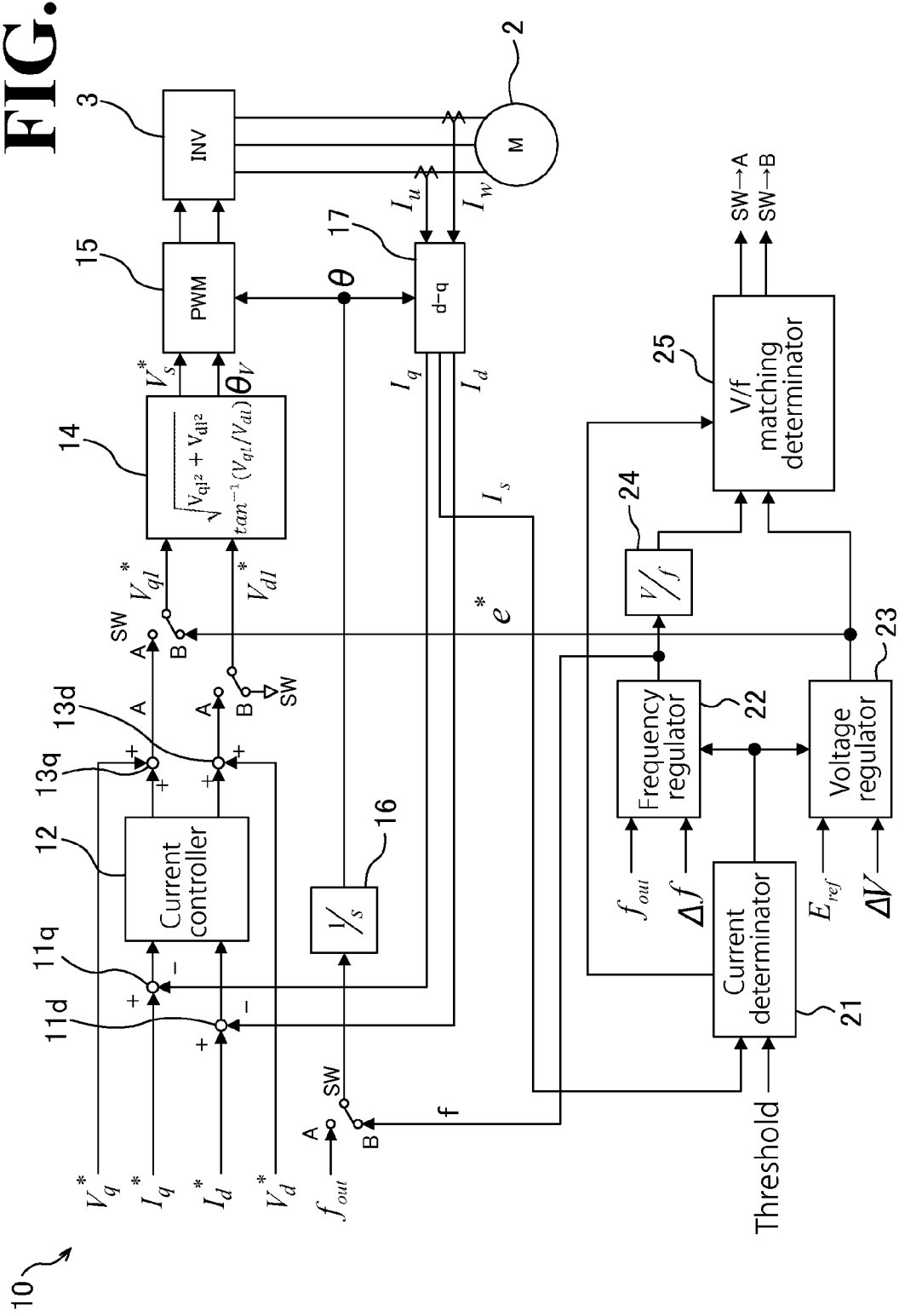
FIG. 2 is a block diagram illustrating exemplary functions of a motor control apparatus.

FIG. 2 is a block diagram illustrating exemplary functions of the motor control apparatus 10. The elements of the motor control apparatus 10 are implemented by the MPU performing the information processing in accordance with the program.

The motor control apparatus 10 executes a normal operation mode when switches SW are at position A, and executes a speed search mode when the switches SW are at position B. In the normal operation mode, V/f control is performed to maintain a constant ratio between the voltage applied to the induction motor 2 and the frequency of the voltage.

The speed search mode is a mode executed for transition of the induction motor 2 from a free running state to a state under the V/f control. The free running state is a state in which the induction motor 2 rotates by inertia when power supply to the induction motor 2 is shut off. In the speed search mode, the voltage applied to the induction motor 2 and the frequency of the voltage are adjusted to ensure that the ratio between the applied voltage and the frequency of the applied voltage is at a predetermined value, and that the frequency is close to the rotation speed of the induction motor 2.

The motor control apparatus 10 includes subtractors 11*d* and 11*q*, a current controller 12, adders 13*d* and 13*q*, a voltage command calculator 14, a PWM controller 15, a speed converter 16, and a d-q converter 17. These elements constitute a configuration to implement control of the induction motor 2, and in particular, to implement the normal operation mode.

The motor control apparatus 10 further includes a current determinator 21, a frequency regulator 22, a voltage regulator 23, a V/f converter 24, and a V/f matching determinator 25. These elements constitute a basic configuration to implement the speed search mode. An additional configuration to implement the speed search mode will be described later.

The subtractors 11*d* and 11*q* respectively calculate differences between d-axis and q-axis current command values Id* and Iq*, which are from an upper level device, and d-axis and q-axis current detection values Id and Iq from the d-q converter 17. Then, the subtractors 11*d* and 11*q* output the differences to the current controller 12.

Based on the differences from the subtractors 11*d* and 11*q*, the current controller 12 calculates d-axis and q-axis voltage base values and outputs the d-axis and q-axis voltage base values respectively to the adders 13*d* and 13*q*.

The adders 13*d* and 13*q* respectively calculate sums of d-axis and q-axis voltage command values Vd* and Vq* from the upper level device and d-axis and q-axis voltage base values from the current controller 12. Then, the adders 13*d* and 13*q* output the sums to the voltage command calculator 14.

When the switches SW are at position A, the voltage command calculator 14 regards the sums from the adders 13*d* and 13*q* as d-axis and q-axis voltage command values $V_{dl}^*$ and $V_{ql}^*$, and calculates a voltage command value $V_S^*$ and a speed command value $\theta_V$ based on the d-axis and q-axis voltage command values $V_{dl}^*$ and $V_{ql}^*$. Then, the voltage command calculator 14 outputs the voltage command value $V_S^*$ and the speed command value $\theta_V$ to the PWM controller 15. The voltage command value $V_S^*$ and the speed command value $\theta_V$ are calculated based on the following formula:

$$V_S^* = \sqrt{V_{ql}^2 + V_{dl}^2}$$

$$\theta_V = \tan^{-1}(V_{ql}/V_{dl})$$

When the switches SW are at position B, the voltage command calculator 14 regards a grounding potential as the d-axis voltage command value $V_{dl}^*$, and regards an induction voltage command e* from the voltage regulator 23 as the q-axis voltage command value $V_{ql}^*$. Based on the d-axis and q-axis voltage command values $V_{dl}^*$ and $V_{ql}^*$, the voltage command calculator 14 calculates the voltage command value $V_S^*$ and the speed command value $\theta_V$, and outputs the voltage command value $V_S^*$ and the speed command value $\theta_V$ to the PWM controller 15.

Based on the voltage command value $V_S^*$ and the speed command value $\theta_V$ from the voltage command calculator 14 and based on a rotation speed θ from the speed converter 16, the PWM controller 15 calculates a control signal to control the rotation of the induction motor 2 by pulse width modulation (PWM), and outputs the control signal to the inverter 3.

When the switches SW are at position A, the speed converter 16 calculates the rotation speed θ based on a frequency command value $f_{out}$, which is from an upper level device, and outputs the rotation speed θ to the PWM controller 15 and the d-q converter 17. When the switches SW are at position B, the speed converter 16 calculates the rotation speed θ based on an output frequency f, which is from the frequency regulator 22, and outputs the rotation speed θ to the PWM controller 15 and the d-q converter 17.

The d-q converter 17 uses the rotation speed θ from the speed converter 16 to perform d-q conversion of current detection values Iu and Iw of AC power supplied from the inverter 3 to the induction motor 2. In this manner, the d-q converter 17 calculates d-axis and q-axis current detection values Id and Iq, and outputs the d-axis and q-axis current detection values Id and Iq to the subtractors 11*d* and 11*q*. Also, the d-q converter 17 calculates a current flowing in the induction motor 2, that is, a stator current $I_S$, and outputs the stator current $I_S$ to the current determinator 21.

The current determinator 21 is an example of the mode changer. In the speed search mode, the current determinator 21 changes between a frequency deceleration step (Step f), which is executed by the frequency regulator 22, and a voltage restoration step (Step V), which is executed by the voltage regulator 23. The current determinator 21 compares the stator current $I_S$ from the d-q converter 17 with two different predetermined thresholds to determine whether to change to the voltage restoration step or the frequency deceleration step.

Specifically, when the stator current $I_S$ exceeds a first threshold $I_{S1}$ in the voltage restoration step, the current determinator 21 implements a transition from the voltage restoration step to the frequency deceleration step. When the stator current $I_S$ becomes smaller than a second threshold $I_{S2}$, which is smaller than the first threshold $I_{S1}$ in the frequency deceleration step, the current determinator 21 implements a transition from the frequency deceleration step to the voltage restoration step.

The first threshold $I_{S1}$ and the second threshold $I_{S2}$ are predetermined based on the magnitude of a no-load current. The no-load current refers to a current in the case where the output frequency f matches the rotation speed of the induction motor 2, and the stator current $I_S$ is left with an exciting current component alone. For example, the first threshold $I_{S1}$ is equal to or more than 1.5 times the no-load current, and the second threshold $I_{S2}$ is equal to or less than 1.2 times the no-load current.

The frequency regulator 22 is an example of the frequency regulator, and executes the frequency deceleration step (an example of the frequency decrease mode), which is to decrease the output frequency f from an upper limit of a search range as time elapses. The output frequency f is a frequency of the voltage applied to the induction motor 2. In the frequency deceleration step, the output frequency f is decreased gradually, that is, by a predetermined minute amount Δf, from the upper limit to a lower limit of the search range. In the frequency deceleration step, the induction voltage command e* is maintained at a constant value.

The voltage regulator 23 is an example of the voltage regulator, and executes the voltage restoration step (an example of the voltage increase mode), which is to increase the induction voltage command e* from a lower limit of a search range as time elapses. The induction voltage command e* corresponds to the voltage applied to the induction motor 2. In the voltage restoration step, the induction voltage command e* is increased gradually, that is, by a predetermined minute amount ΔV, from the lower limit to an upper limit of the search range. In the voltage restoration step, the output frequency f is maintained at a constant value.

The V/f converter 24 multiplies the output frequency f output from the frequency regulator 22 by a predetermined ratio V/f to calculate a voltage conversion value. Then, the V/f converter 24 outputs the voltage conversion value to the V/f matching determinator 25.

The V/f matching determinator 25 is an example of the determinator, and determines whether the ratio of the induction voltage command e* output from the voltage regulator 23 to the output frequency f output from the frequency regulator 22 matches the predetermined ratio V/f. That is, the V/f matching determinator 25 determines whether the voltage conversion value output from the frequency regulator 22 matches the induction voltage command e* output from the voltage regulator 23.

In the voltage restoration step, when the ratio of the induction voltage command e* to the output frequency f matches the predetermined ratio V/f, the V/f matching determinator 25 outputs a switch change signal to change the switches SW from position B to position A. Thus, the speed search mode is changed to the normal operation mode.

In the frequency deceleration step, when the ratio of the induction voltage command e* to the output frequency f matches the predetermined ratio V/f and satisfies a condition that is described later, the V/f matching determinator 25 outputs a switch change signal to change the switches SW from position B to position A.

Figure 3:
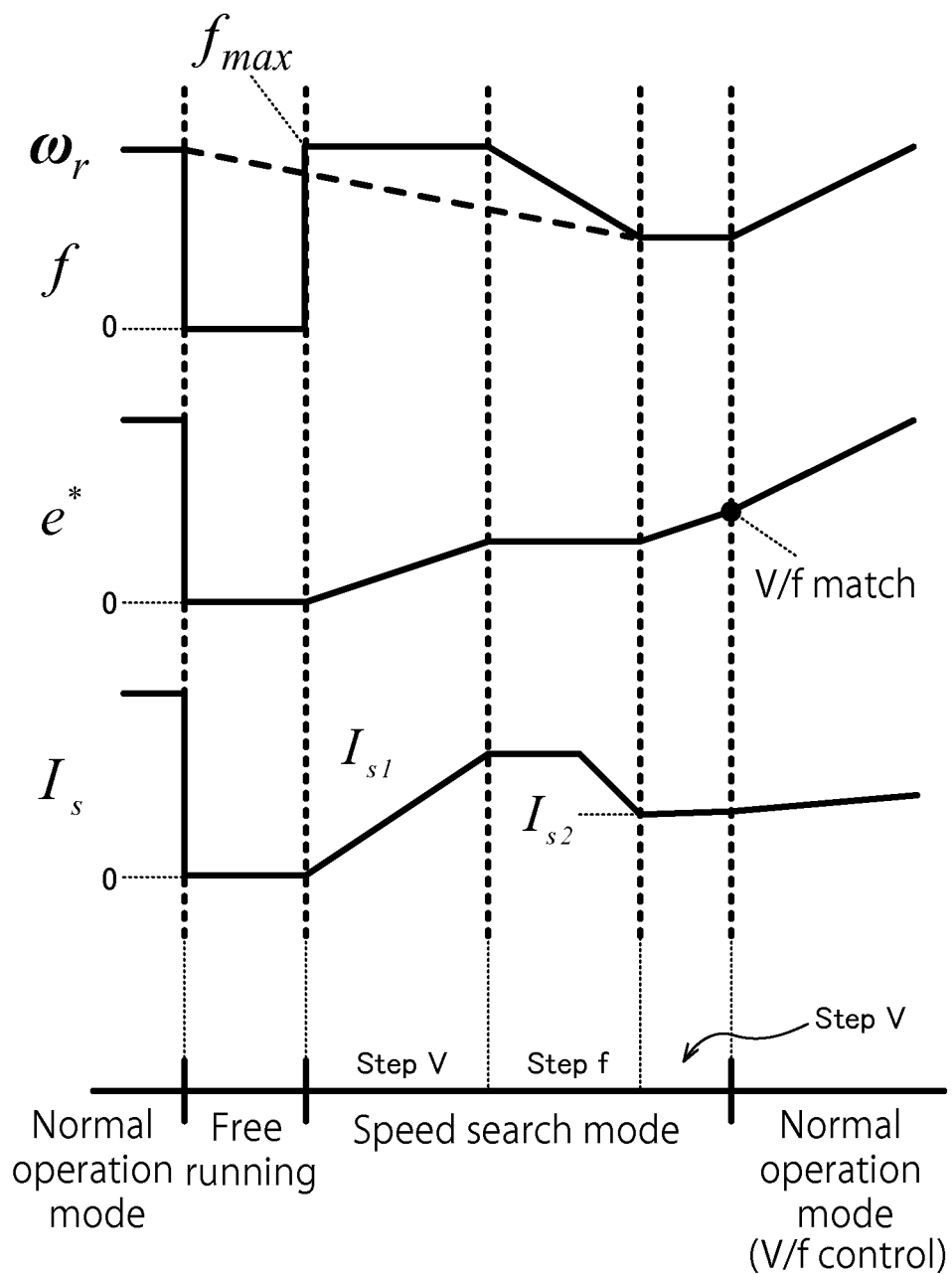
FIG. 3 is a time chart illustrating an exemplary operation of the robot control apparatus.

FIG. 3 is a time chart illustrating an exemplary operation of the motor control apparatus 10. FIG. 3 shows behaviors that the output frequency f, the induction voltage command e*, and the stator current $I_S$ exhibit in the course of change from the free running state through the speed search mode to the normal operation mode. The behavior of the output frequency f is shown together with a behavior of the rotation speed $\omega_r$ of the induction motor 2, in dashed line.

First, when the motor control apparatus 10 shuts off power supply to the induction motor 2 in the normal operation mode, the induction motor 2 changes into the free running state, and the rotation speed $\omega_r$ starts to decrease. In the free running state, the output frequency f, the induction voltage command e*, and the stator current $I_S$ are zero.

Next, when the motor control apparatus 10 starts the speed search mode, the output frequency f is set at a maximum value $f_{max}$ in the search range, and the induction voltage command e* is set at zero, which is the minimum value in the search range. Here, even in a "slip state", in which the output frequency f is far from the rotation speed $\omega_r$ of the induction motor 2, the induction voltage command e* is zero, and thus the stator current $I_S$ remains at zero, and does not increase from zero.

In the speed search mode, the voltage restoration step (Step V) is first executed. In the voltage restoration step, the induction voltage command e* gradually increases from zero as time elapses, and the output frequency f is maintained at the maximum value $f_{max}$. Since the present state is the slip state, as the induction voltage command e* increases, the stator current $I_S$ increases accordingly.

When the stator current $I_S$ exceeds the first threshold $I_{S1}$, the frequency deceleration step (Step f) is executed. In the frequency deceleration step, the output frequency f gradually decreases from the maximum value $f_{max}$ as time elapses, while the induction voltage command e* is maintained at the value as of the end of the voltage restoration step. When the output frequency f decreases, the slip state is relieved, and the stator current $I_S$ decreases accordingly.

When the stator current $I_S$ becomes smaller than the second threshold $I_{S2}$, the voltage restoration step (Step V) is executed again.

In the voltage restoration step, when the induction voltage command e* reaches a V/f matching point, the motor control apparatus 10 ends the speed search mode and starts the normal operation mode. The V/f matching point is a point at which the ratio of the induction voltage command e* to the output frequency f matches the predetermined ratio V/f.

Thus, alternating the voltage restoration step and the frequency deceleration step ensures search of the V/f matching point while minimizing or eliminating excessive increase of the stator current $I_S$.

The above description by referring to FIG. 3 is concerning an example in which the induction voltage command e* reaches the V/f matching point in the voltage restoration step. An example in which the induction voltage command e* reaches the V/f matching point in the frequency deceleration step will be described later.

In this embodiment, the voltage restoration step and the frequency deceleration step have been described as alternating based on the magnitude of the stator current $I_S$. This, however, should not be construed in a limiting sense. Another possible example is that the voltage restoration step and the frequency deceleration step alternate at predetermined time intervals.

Figure 4:
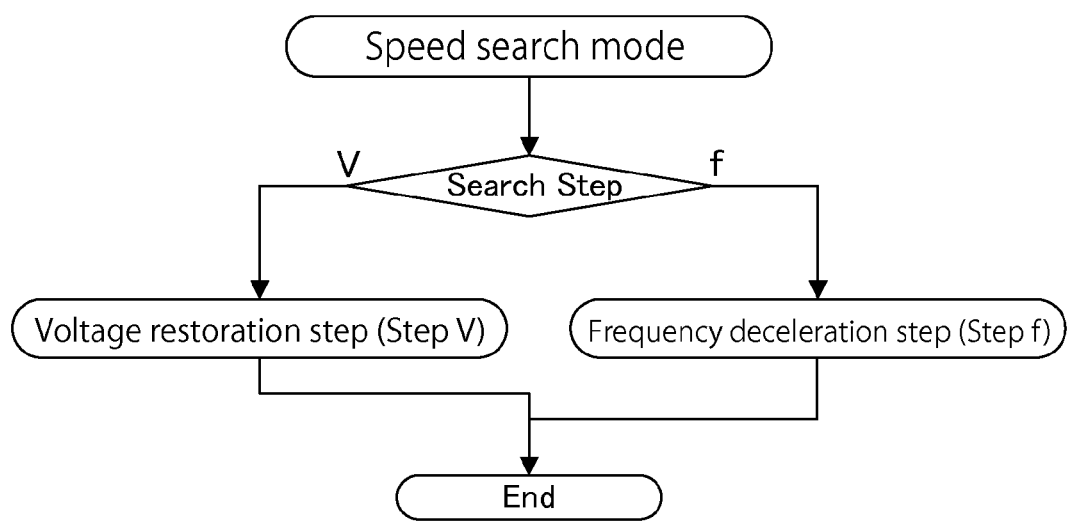
FIG. 4 is a flowchart illustrating an exemplary speed search mode.
Figure 5:
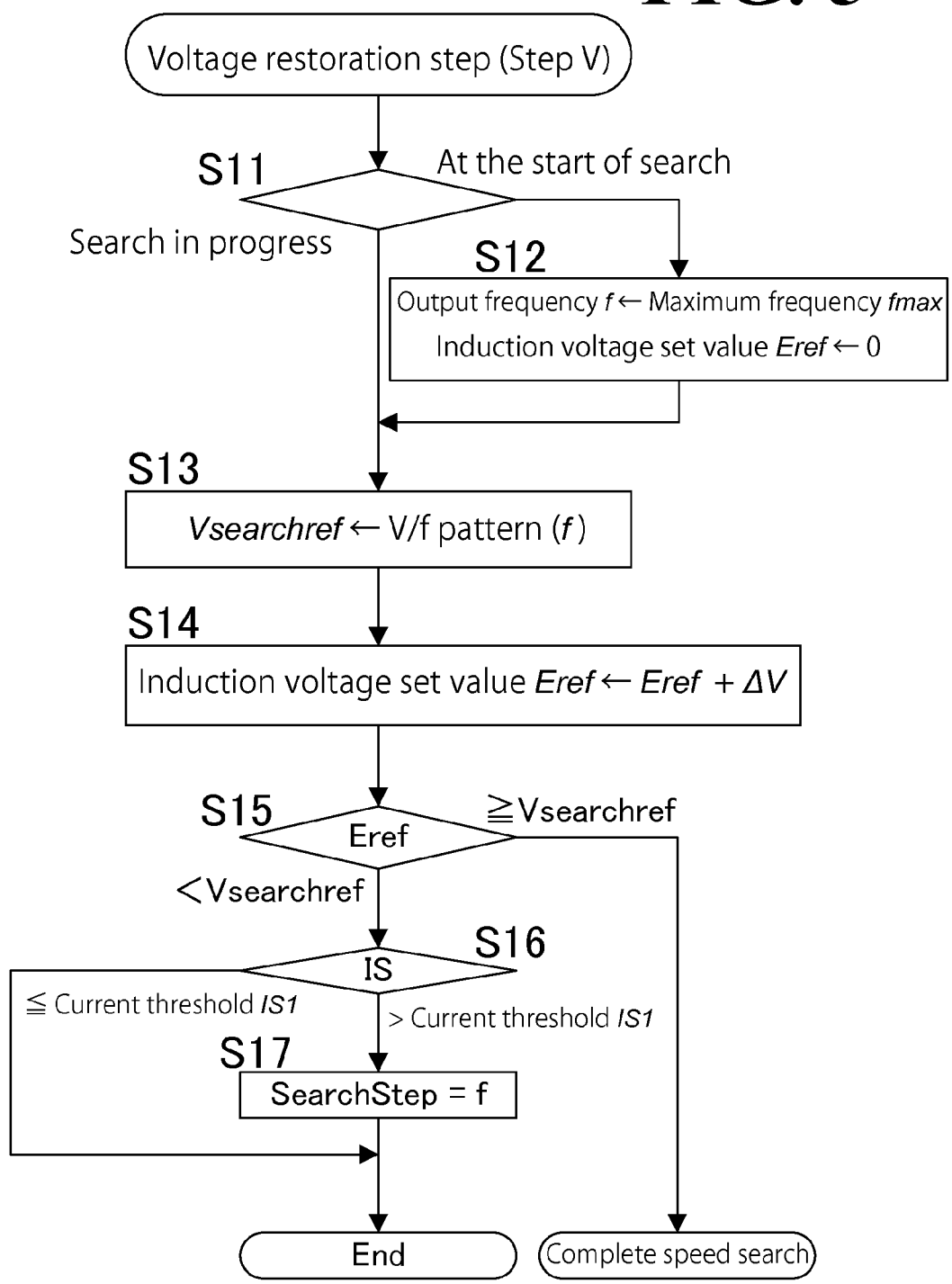
FIG. 5 is a flowchart illustrating an exemplary voltage restoration step.
Figure 6:
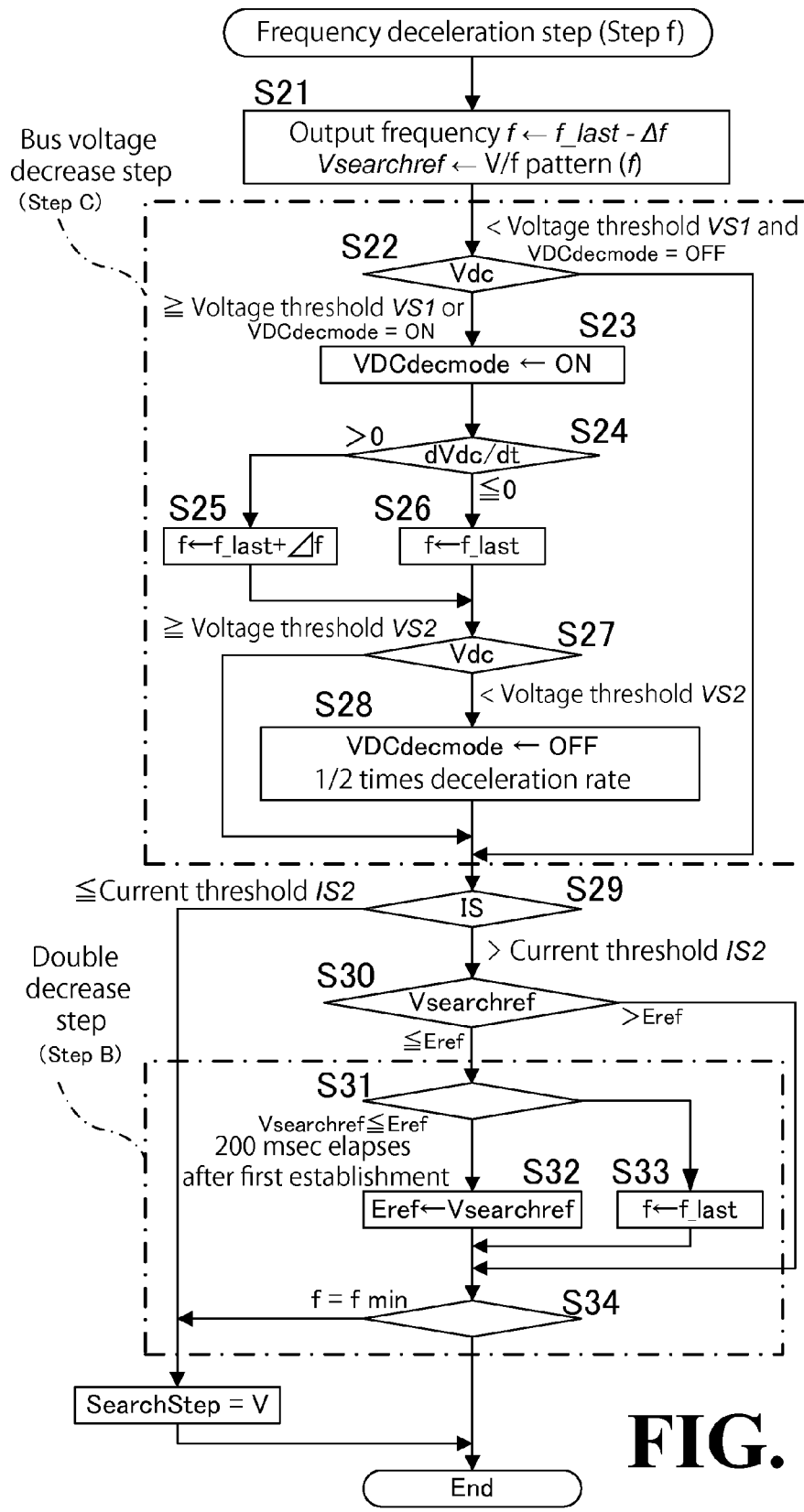
FIG. 6 is a flowchart illustrating an exemplary frequency deceleration step.

FIG. 4 is a flowchart illustrating an exemplary speed search mode. FIG. 5 is a flowchart illustrating an exemplary voltage restoration step. FIG. 6 is a flowchart illustrating an exemplary frequency deceleration step. The series of processing shown in FIGS. 4 through 6 is repeated at predetermined intervals (of, for example, several milliseconds). Referring to FIG. 6, the frequency deceleration step includes a double decrease step (Step B) and a bus voltage decrease step (Step C), which will be described in detail later.

In the speed search mode shown in FIG. 4, the motor control apparatus 10 determines whether the voltage restoration step (Step V) or the frequency deceleration step (Step f) is selected. When the search starts, that is, immediately after the free running state has changed to the speed search mode, the voltage restoration step is selected.

In the voltage restoration step (Step V) shown in FIG. 5, the motor control apparatus 10 determines whether the search is in its beginning or the search is in progress (S11). When the search is in its beginning, the motor control apparatus 10 sets the output frequency f at the maximum value $f_{max}$ in the search range, and sets an induction voltage set value $E_{ref}$ at zero, which is the minimum value in the search range (S12). When the search is in progress, the motor control apparatus 10 does not perform this setting.

Next, the motor control apparatus 10 multiplies the output frequency f by the predetermined ratio V/f to obtain a voltage conversion value $V_{searchref}$ (S13). Also, the motor control apparatus 10 adds the predetermined minute amount Δf to the induction voltage set value $E_{ref}$ (S14). Next, the motor control apparatus 10 determines whether the induction voltage set value $E_{ref}$ is equal to or larger than the voltage conversion value $V_{searchref}$ or smaller than the voltage conversion value $V_{searchref}$ (S15).

When the induction voltage set value $E_{ref}$ is equal to or larger than the voltage conversion value $V_{searchref}$, the motor control apparatus 10 ends the speed search mode and starts the normal operation mode. When the induction voltage set value $E_{ref}$ is smaller than the voltage conversion value $V_{searchref}$, the motor control apparatus 10 determines whether the stator current $I_S$ is in excess of the first threshold $I_{S1}$ or the stator current $I_S$ is equal to or smaller than the first threshold $I_{S1}$ (S16).

When the stator current $I_S$ is in excess of the first threshold $I_{S1}$, the motor control apparatus 10 selects the frequency deceleration step (Step f) and ends the processing. In this case, the frequency deceleration step is executed in the next processing. When the stator current $I_S$ is equal to or smaller than the first threshold $I_{S1}$, the motor control apparatus 10 ends the processing. In this case, the voltage restoration step is executed again in the next processing.

In the frequency deceleration step (Step f) shown in FIG. 6, the motor control apparatus 10 subtracts the predetermined minute amount $\Delta f$ from the output frequency f, and multiplies the output frequency f by the predetermined ratio V/f to obtain the voltage conversion value $V_{searchref}$ (S21). The motor control apparatus 10 performs the bus voltage decrease step (Step C), described later, and then determines whether the stator current $I_S$ is equal to or smaller than the second threshold $I_{S2}$ or the stator current $I_S$ is in excess of the second threshold $I_{S2}$ (S29).

When the stator current $I_S$ is equal to or smaller than the second threshold $I_{S2}$, the motor control apparatus 10 selects the voltage restoration step (Step V) and ends the processing. In this case, the voltage restoration step is selected in the next processing. When the stator current $I_S$ is in excess of the second threshold $I_{S2}$, the motor control apparatus 10 determines whether the voltage conversion value $V_{searchref}$ is equal to or smaller than the induction voltage set value $E_{ref}$ or the voltage conversion value $V_{searchref}$ is in excess of the induction voltage set value $E_{ref}$ (S30).

When the voltage conversion value $V_{searchref}$ is equal to or smaller than the induction voltage set value $E_{ref}$, the motor control apparatus 10 executes the double decrease step (Step B), described later. When the voltage conversion value $V_{searchref}$ is in excess of the induction voltage set value $E_{ref}$, the motor control apparatus 10 ends the processing unless the output frequency f is at a minimum value $f_{min}$ (S34). In this case, the frequency deceleration step is selected again in the next processing.

<Double Decrease Step>

The double decrease step (Step B) included in the frequency deceleration step (Step f) will be described.

As described above, in order to minimize or eliminate excessive increase of the stator current $I_S$, the voltage restoration step is changed to the frequency deceleration step when the stator current $I_S$ exceeds the first threshold $I_{S1}$. In the frequency deceleration step, when the output frequency f decreases, the output frequency f becomes close to the rotation speed $\omega_r$ of the induction motor 2, and thus the stator current $I_S$ decreases from the first threshold $I_{S1}$.

In the frequency deceleration step, however, when the output frequency f reaches the V/f matching point before the stator current $I_S$ decreases to the second threshold $I_{S2}$, the output frequency f may not be sufficiently close to the rotation speed $\omega_r$ of the induction motor 2. If this state is maintained in the transition to the normal operation mode, the stator current $I_S$ may increase excessively.

A reason why the stator current $I_S$ does not decrease to the second threshold $I_{S2}$ is possibly that the load of the induction motor 2 is so large that the torque current component included in the stator current $I_S$ does not sufficiently decrease. Another possible reason is erroneous setting of the second threshold $I_{S2}$ and the no-load current on which the second threshold $I_{S2}$ is based.

In view of this, in this embodiment, when the output frequency f reaches the V/f matching point in the frequency deceleration step, the following double decrease step is executed.

Figure 7:
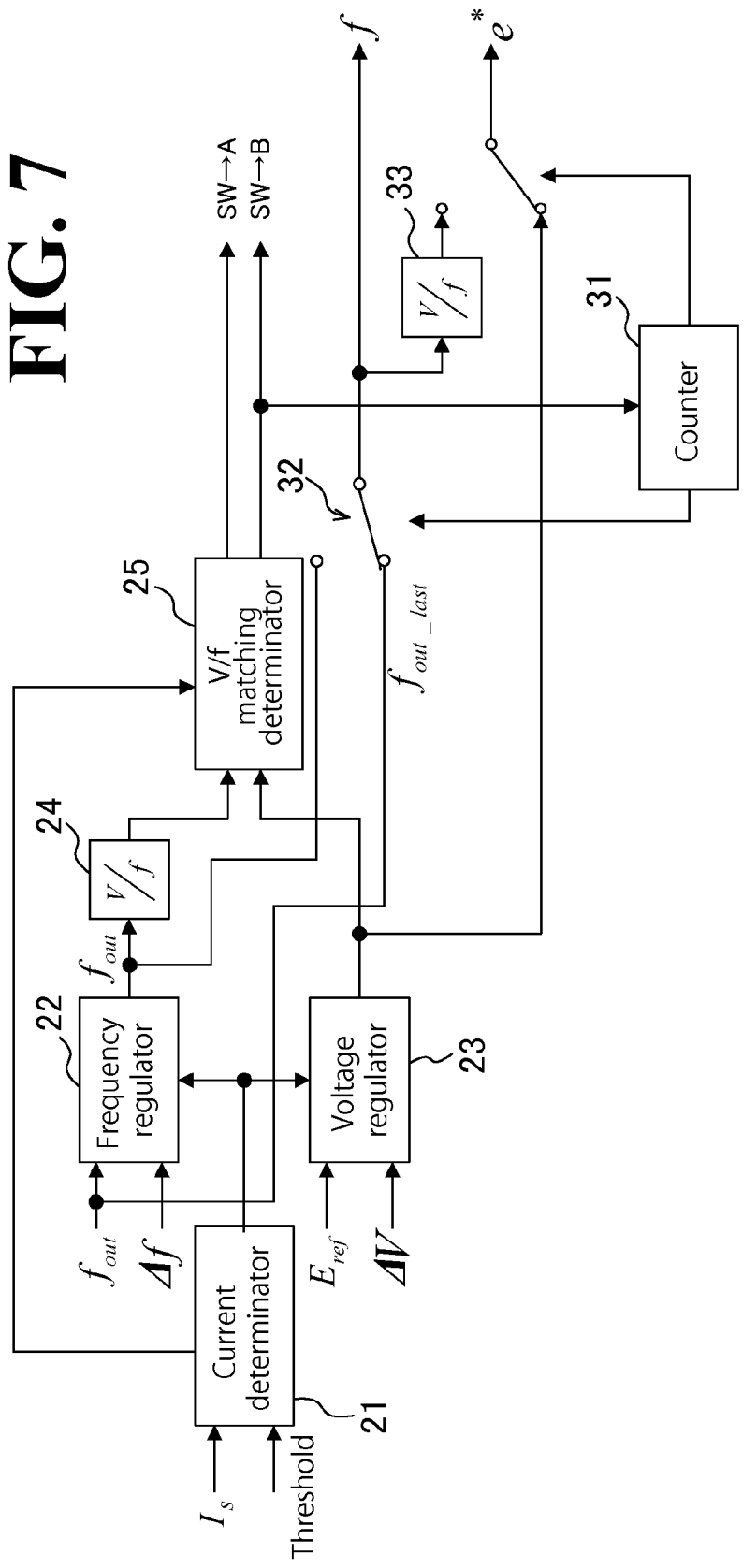
FIG. 7 is a block diagram illustrating a configuration to implement a double decrease step.

FIG. 7 is a block diagram illustrating a configuration to implement the double decrease step. As the configuration to execute the double decrease step, the motor control apparatus 10 includes a counter 31, a switch 32, and a V/f converter 33.

When a predetermined period of time elapses after the output frequency f reaches the V/f matching point in the frequency deceleration step, the counter 31 outputs a change signal to the switch 32.

When the change signal is input to the switch 32 from the counter 31, the switch 32 changes the output frequency f from a frequency before passing through the frequency regulator 22 (frequency $f_{out\_last}$ in the last cycle) to a frequency after passing through the frequency regulator 22 (frequency $f_{out}$ in the present cycle). This ensures that the output frequency f is maintained at a constant value until a predetermined period of time elapses. Upon elapse of the predetermined period of time, the output frequency f resumes decreasing.

The V/f converter 33 multiplies the output frequency f output from the switch 32 by the predetermined ratio V/f to calculate and output a voltage conversion value.

When a pulse signal is output from the counter 31, the induction voltage command e* is changed from a value output from the voltage regulator 23 to the voltage conversion value calculated by the V/f converter 33, and decreases together with the output frequency f.

Figure 8:
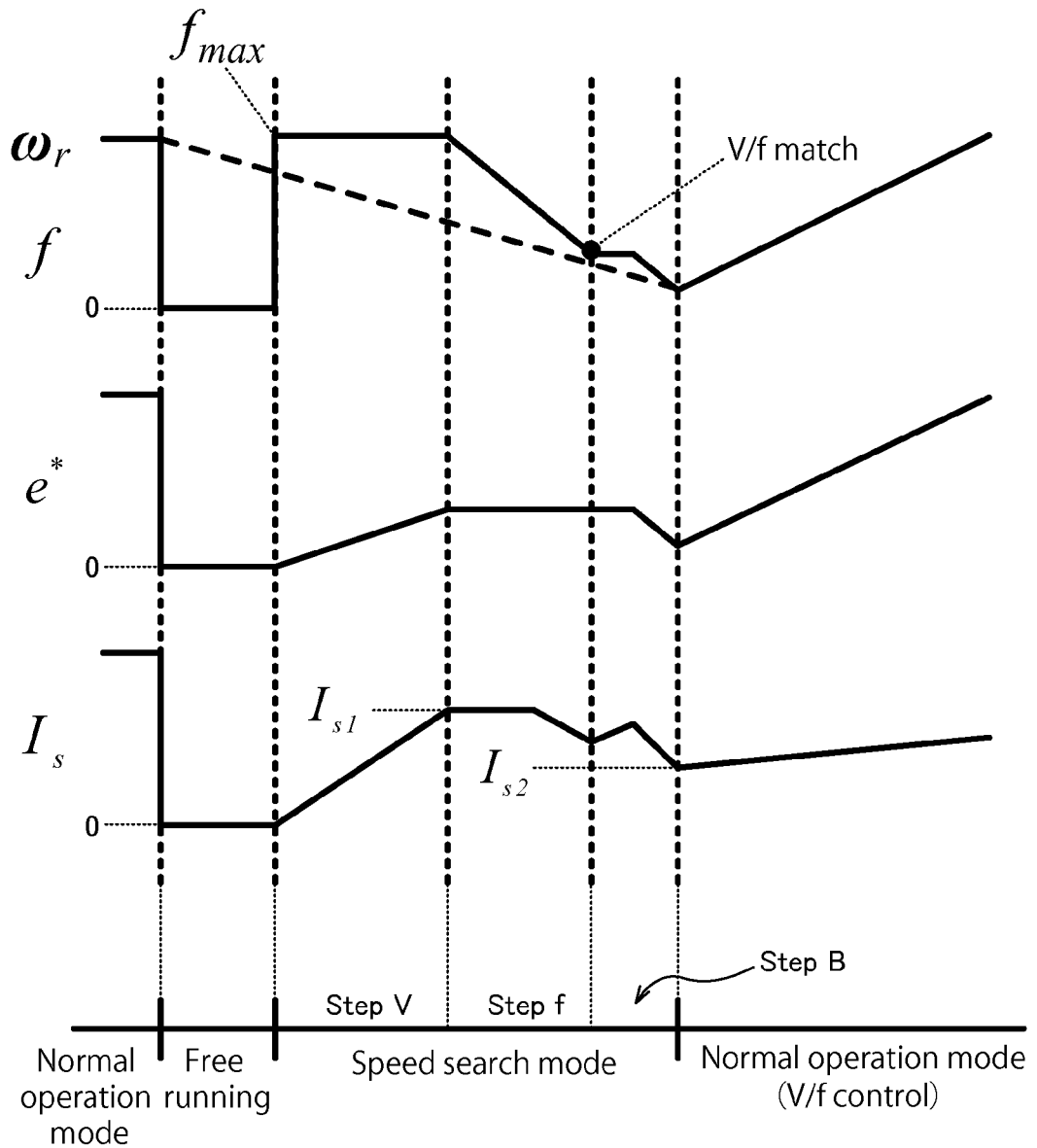
FIG. 8 is a time chart illustrating an exemplary double decrease step.
Figure 9:
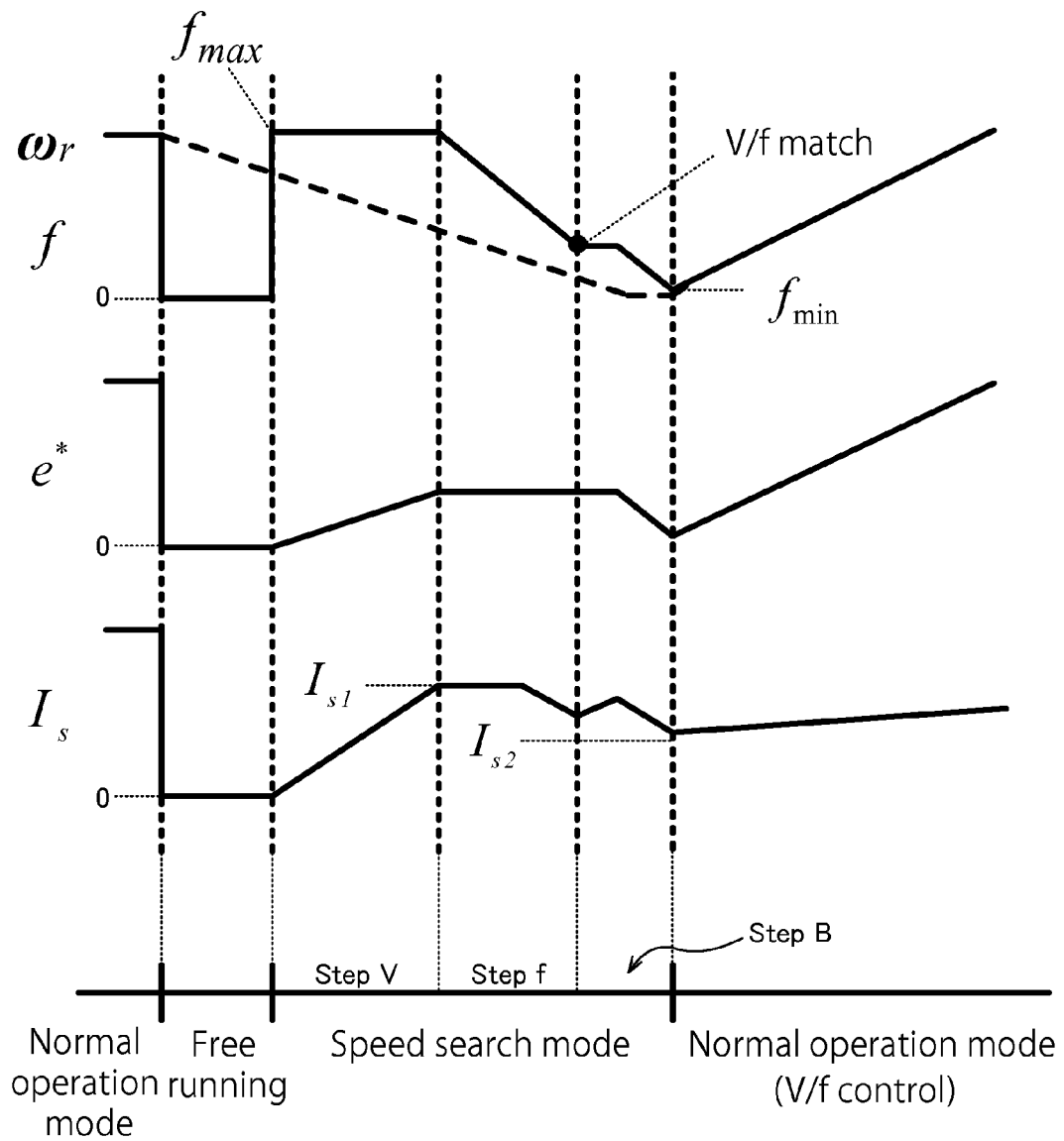
FIG. 9 is a time chart illustrating an exemplary double decrease step.

The motor control apparatus 10 executes the double decrease step with the above-described configuration. FIGS. 8 and 9 are time charts illustrating examples of the double decrease step.

When the motor control apparatus 10 starts the double decrease step, the output frequency f is first maintained for a predetermined period of time at the value as of the time when the output frequency f reaches the V/f matching point. Also, the induction voltage command e* remains unchanged.

When the stator current $I_S$ becomes smaller than the second threshold $I_{S2}$ while the output frequency f is maintained for the predetermined period of time, the motor control apparatus 10 ends the speed search mode and starts the normal operation mode. The second threshold $I_{S2}$ should not be construed in a limiting sense; it is possible to use a different threshold smaller than the first threshold $I_{S1}$.

If a filter is used to detect the stator current $I_S$, a time lag may occur in the detection. This may lead to an erroneous determination in that the actual output frequency f is not close to the rotation speed $\omega_r$ of the induction motor 2, while the actual output frequency f is sufficiently close to the rotation speed $\omega_r$ of the induction motor 2. A reason for maintaining the output frequency f for the predetermined period time is to prevent such an erroneous determination.

When the stator current $I_S$ does not become smaller than the second threshold $I_{S2}$ even though the output frequency f is maintained for the predetermined period of time, both the output frequency f and the induction voltage command e* decrease as time elapses while satisfying the predetermined ratio V/f:

When the stator current $I_S$ becomes smaller than the second threshold $I_{S2}$ while both the output frequency f and the induction voltage command e* are decreasing, the motor control apparatus 10 ends the speed search mode and starts the normal operation mode. The second threshold $I_{S2}$ should not be construed in a limiting sense; it is possible to use a different threshold smaller than the first threshold $I_{S1}$.

Even if the output frequency f is not sufficiently close to the rotation speed $\omega_r$ of the induction motor 2 when the output frequency f reaches the V/f matching point, both the output frequency f and the induction voltage command e* are decreased in the above-described manner. This makes the output frequency f close to the rotation speed $\omega_r$ of the induction motor 2. Moreover, decreasing both the output frequency f and the induction voltage command e* minimizes or eliminates excessive increase of the stator current $I_S$.

When the stator current $I_S$ does not become smaller than the second threshold $I_{S2}$ even though both the output frequency f and the induction voltage command e* are decreased, and when the output frequency f reaches the minimum value $f_{min}$, the motor control apparatus 10 ends the speed search mode and starts the normal operation mode.

When the output frequency f reaches the minimum value $f_{min}$, both the output frequency f and the rotation speed $\omega_r$ of the induction motor 2 are sufficiently decreased. This ensures transition to the normal operation mode without excessive increase of the stator current $I_S$.

Description will be made regarding the double decrease step (Step B) included in the frequency deceleration step (Step f) shown in FIG. 6.

When the voltage conversion value $V_{searchref}$ is equal to or smaller than the induction voltage set value $E_{ref}$ (S30), the motor control apparatus 10 determines whether a predetermined period of time (of, for example, 200 milliseconds) has elapsed from the time of first establishment of the state in which the voltage conversion value $V_{searchref}$ is equal to or smaller than the induction voltage set value $E_{ref}$ (S31).

When the predetermined period of time has not elapsed, the motor control apparatus 10 returns the output frequency f to a value $f_{last}$ as of the last cycle, that is, to a state before subtraction of the minute amount $\Delta f$ (S33), and ends the processing. Thus, the output frequency f is maintained at a constant value until the predetermined period of time elapses.

When the stator current $I_S$ becomes equal to or smaller than the second threshold $I_{S2}$ while the output frequency f is maintained at a constant value (S29), the motor control apparatus 10 selects the voltage restoration step (Step V) and ends the processing. In this case, the voltage restoration step is selected in the next processing. Further, the speed search mode ends, and the normal operation mode starts.

When the predetermined period of time has elapsed, the motor control apparatus 10 regards the induction voltage set value $E_{ref}$ as the voltage conversion value $V_{searchref}$ (S32), and ends the processing. From now on, both the output frequency f and the induction voltage set value $E_{ref}$ decrease with the induction voltage set value $E_{ref}$ matching the voltage conversion value $V_{searchref}$, that is, with the ratio of the induction voltage set value $E_{ref}$ to the output frequency f matching the predetermined ratio V/f.

When the stator current $I_S$ becomes equal to or smaller than the second threshold $I_{S2}$ while both the output frequency f and the induction voltage set value $E_{ref}$ are decreasing (S29), the motor control apparatus 10 also selects the voltage restoration step (Step V) and ends the processing. In this case as well, the voltage restoration step is selected in the next processing. Further, the speed search mode ends, and the normal operation mode starts.

When the output frequency f becomes the minimum value $f_{min}$ while the stator current $I_S$ is not equal to or smaller than the second threshold $I_{S2}$ even though both the output frequency f and the induction voltage set value $E_{ref}$ have decreased (S34), the motor control apparatus 10 selects the voltage restoration step (Step V) and ends the processing. In this case as well, the voltage restoration step is selected in the next processing. Further, the speed search mode ends, and the normal operation mode starts.

<Bus Voltage Decrease Step>

The bus voltage decrease step (Step C) included in the frequency deceleration step (Step f) will be described.

As described above, in the frequency deceleration step, in order to make the output frequency f close to the rotation speed $\omega_r$ of the induction motor 2, the output frequency f is decreased as time elapses. Incidentally, when the induction motor 2 has inertia large enough to make it difficult to decrease the rotation speed $\omega_r$, or when the deceleration rate at which to decrease the output frequency f is excessively high, the output frequency f may drop below the rotation speed $\omega_r$ of the induction motor 2.

When the output frequency f becomes smaller than the rotation speed $\omega_r$ of the induction motor 2, the induction motor 2 turns into a regeneration state, in which excessive regeneration voltage may be applied to a bus 91 (see FIG. 1) to supply DC power to the inverter 3.

In view of this, in this embodiment, the bus voltage decrease step described below is executed in the frequency deceleration step.

Figure 10:
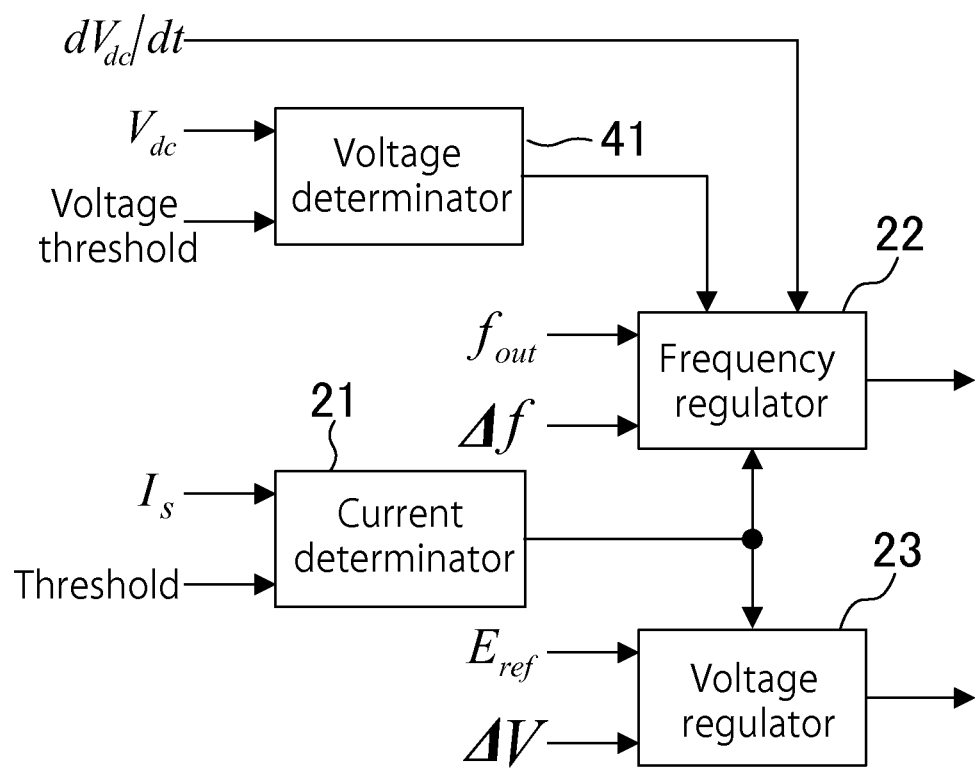
FIG. 10 is a block diagram illustrating a configuration to implement a bus voltage decrease step.

FIG. 10 is a block diagram illustrating a configuration to implement the bus voltage decrease step. The motor control apparatus 10 includes a voltage determinator 41 to constitute the configuration to implement the bus voltage decrease step.

When a bus voltage $V_{dc}$, which is a detection value of DC voltage applied to the smoothing capacitor 6 (see FIG. 1), exceeds a first voltage threshold $V_{S1}$, the voltage determinator 41 outputs to the frequency regulator 22 a voltage exceeding signal indicating that the bus voltage $V_{dc}$ exceeds the first voltage threshold $V_{S1}$. When the bus voltage $V_{dc}$ becomes smaller than a second voltage threshold $V_{S2}$, which is smaller than the first voltage threshold $V_{S1}$, the voltage determinator 41 outputs to the frequency regulator 22 a voltage restoration signal indicating that the bus voltage $V_{dc}$ becomes smaller than the second voltage threshold $V_{S2}$.

In response to the voltage exceeding signal, the frequency regulator 22 limits the decrease of the output frequency f. Also, $dV_{dc}/dt$, which is an amount of change per predetermined period of time in the bus voltage $V_{dc}$, is input to the frequency regulator 22. When the frequency regulator 22 receives the voltage exceeding signal and when the amount of change $dV_{dc}/dt$ is a positive value, the frequency regulator 22 increases the output frequency f. When the frequency regulator 22 receives the voltage exceeding signal and when the amount of change $dV_{dc}/dt$ is zero or a negative value, the frequency regulator 22 maintains the output frequency f. Here, an example of the predetermined period of time is a cycle in which the speed search mode is repeated.

In response to the voltage restoration signal, the frequency regulator 22 resumes decreasing the output frequency f. The deceleration rate of the output frequency f after resumed decrease is set at an exemplary rate smaller than approximately half the pre-limited deceleration rate of the output frequency f. The term deceleration rate refers to the amount of decrease per predetermined period of time in the output frequency f. In this case as well, an example of the predetermined period of time is a cycle in which the speed search mode is repeated.

Figure 11:
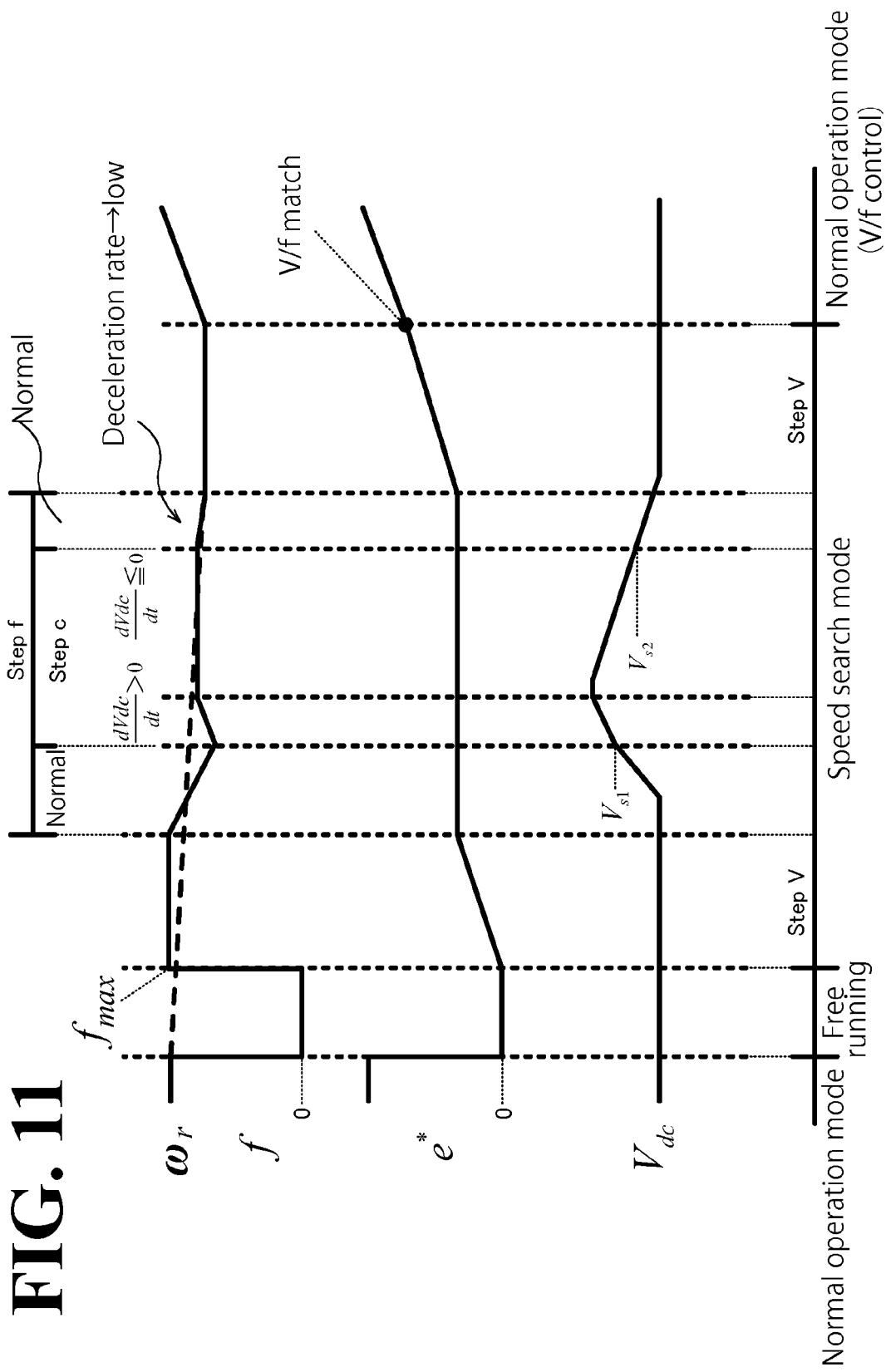
FIG. 11 is a time chart illustrating an exemplary bus voltage decrease step.

The motor control apparatus 10 executes the bus voltage decrease step with the above-described configuration. FIG. 11 is a time chart illustrating an exemplary bus voltage decrease step.

In the frequency deceleration step (Step f), when the bus voltage $V_{dc}$ exceeds the first voltage threshold $V_{S1}$, the motor control apparatus 10 starts the bus voltage decrease step (Step C). In the bus voltage decrease step, the output frequency f is increased or maintained so as to limit the decrease of the output frequency f.

Specifically, when the amount of change per predetermined period of time $dV_{dc}/dt$ in the bus voltage $V_{dc}$ is a positive value, the motor control apparatus 10 increases the output frequency f. This minimizes or eliminates excessive increase of the bus voltage $V_{dc}$. When the amount of change $dV_{dc}/dt$ is zero or a negative value, the motor control apparatus 10 maintains the output frequency f. This suppresses the bus voltage $V_{dc}$ while making the output frequency f close to the rotation speed $\omega_r$ of the induction motor 2.

Then, when the bus voltage $V_{dc}$ becomes smaller than the second voltage threshold $V_{S2}$, which is smaller than the first voltage threshold $V_{S1}$, the motor control apparatus 10 resumes decreasing the output frequency f. The deceleration rate of the output frequency f after resumed decrease is set at an exemplary rate smaller than approximately half the pre-limited deceleration rate of the output frequency f. This makes the deceleration rate of the output frequency f close to the deceleration rate of the rotation speed $\omega_r$ of the induction motor 2.

The bus voltage decrease step (Step C) included in the frequency deceleration step (Step f) shown in FIG. 6 will be described.

The motor control apparatus 10 subtracts the predetermined minute amount $\Delta f$ from the output frequency f and obtains the voltage conversion value $V_{searchref}$ (S21). Then, the motor control apparatus 10 determines whether the bus voltage $V_{dc}$ is equal to or larger than the first voltage threshold $V_{S1}$ or the bus voltage $V_{dc}$ is smaller than the first voltage threshold $V^{S1}$ (S22).

When the bus voltage $V_{dc}$ is equal to or larger than the first voltage threshold $V_{S1}$, the motor control apparatus 10 turns on a flag indicating the bus voltage decrease step (S23). It should be noted that even when the flag is on at and after the next cycle, the processing proceeds from S22 to S23.

Next, the motor control apparatus 10 determines whether the amount of change per predetermined period of time $dV_{dc}/dt$ in the bus voltage $V_{dc}$ is a positive value or the amount of change $dV_{dc}/dt$ is zero or a negative value (S24).

When the amount of change $dV_{dc}/dt$ is a positive value, the motor control apparatus 10 adds the predetermined minute amount $\Delta f$ to the value $f_{last}$ of the output frequency f in the last cycle, and regards the sum as the output frequency f. In this manner, the motor control apparatus 10 increases the output frequency f (S25).

When the amount of change $dV_{dc}/dt$ is zero or a negative value, the motor control apparatus 10 regards the output frequency f as the value $f_{last}$ in the last cycle, and maintains the output frequency f (S26).

Next, the motor control apparatus 10 determines whether the bus voltage $V_{dc}$ is equal to or larger than the second voltage threshold $V_{S2}$ or the bus voltage $V_{dc}$ is smaller than the second voltage threshold $V_{S2}$ (S27).

When the bus voltage $V_{dc}$ is equal to or larger than the second voltage threshold $V_{S2}$, the motor control apparatus 10 proceeds the processing to S29 and later steps.

When the bus voltage $V_{dc}$ is smaller than the second voltage threshold $V_{S2}$, the motor control apparatus 10 turns off the flag indicating the bus voltage decrease step, and multiplies the deceleration rate of the output frequency f by ½. Then, the motor control apparatus 10 proceeds the processing to S29 and later steps.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A motor control apparatus comprising:
   a voltage regulator configured to execute a voltage increase mode to increase a voltage applied to an induction motor from a lower limit of a first predetermined range over time;
   a frequency regulator configured to execute a frequency decrease mode to decrease a frequency of the applied voltage from an upper limit of a second predetermined range over time, the frequency regulator being configured to limit decrease of the frequency when a bus voltage of a bus exceeds a first threshold in the frequency decrease mode, the bus supplying DC power to an inverter to drive the induction motor;
   a mode changer configured to alternatively change the voltage increase mode and the frequency decrease mode so as to control the induction motor to change from a free running state to a state in which the applied voltage and the frequency satisfy a predetermined relationship; and
   a determinator configured to determine whether the applied voltage and the frequency satisfy the predetermined relationship,
   wherein the frequency regulator is configured to:
      gradually increase the frequency over time in response to a determination that the bus voltage exceeds the first threshold and an amount of change in the bus voltage per predetermined period of time is a positive value, or
      maintain the frequency at a constant value over time in response to a determination that the bus voltage exceeds the first threshold and an amount of change in the bus voltage per predetermined period of time is zero or a negative value.

2. The motor control apparatus according to claim 1, wherein the frequency regulator is configured to increase the frequency when the bus voltage exceeds the first threshold and when an amount of change in the bus voltage per predetermined period of time is a positive value.

3. The motor control apparatus according to claim 1, wherein the frequency regulator is configured to maintain the frequency when the bus voltage exceeds the first threshold and when an amount of change in the bus voltage per predetermined period of time is not a positive value.

4. The motor control apparatus according to claim 1, wherein when the bus voltage becomes smaller than a second threshold smaller than the first threshold, the frequency regulator is configured to resume decreasing the frequency while making an amount of decrease of the frequency per predetermined period of time smaller than an amount of decrease of the frequency per predetermined period of time corresponding to time before the frequency regulator limited the decrease of the frequency.

5. A method for controlling a motor, the method comprising:
  alternatively changing a voltage increase mode executed by a voltage regulator and a frequency decrease mode executed by a frequency regulator, the voltage increase mode being for increasing a voltage applied to an induction motor from a lower limit of a predetermined range over time, the frequency decrease mode being for decreasing a frequency of the applied voltage from an upper limit of a predetermined range over time;
  limiting decrease of the frequency so as to control the induction motor to change from a free running state to a state in which the applied voltage and the frequency satisfy a predetermined relationship when a bus voltage of a bus exceeds a first threshold in the frequency decrease mode, the bus supplying DC power to an inverter to drive the induction motor;
  maintaining or increasing the frequency over time when the bus voltage exceeds the first threshold by:
    gradually increasing the frequency over time with the frequency regulator in response to a determination that the bus voltage exceeds the first threshold and an amount of change in the bus voltage per predetermined period of time is a positive value, or
    maintaining the frequency at a constant value over time with the frequency regulator in response to a determination that the bus voltage exceeds the first threshold and an amount of change in the bus voltage per predetermined period of time is zero or a negative value; and
  determining whether the applied voltage and the frequency satisfy the predetermined relationship.

6. A motor control apparatus comprising:
  a voltage regulator configured to execute a voltage increase mode to increase a voltage applied to an induction motor from a lower limit of a first predetermined range over time;
  frequency regulating means for executing a frequency decrease mode to decrease a frequency of the applied voltage from an upper limit of a second predetermined range over time, the frequency regulating means being for limiting decrease of the frequency when a bus voltage of a bus exceeds a first threshold in the frequency decrease mode, the bus supplying DC power to an inverter to drive the induction motor;
  a mode changer configured to alternatively change the voltage increase mode and the frequency decrease mode so as to control the induction motor to change from a free running state to a state in which the applied voltage and the frequency satisfy a predetermined relationship; and
  determining means for determining whether the applied voltage and the frequency satisfy the predetermined relationship,
  the frequency regulating means being for:
    gradually increasing the frequency over time in response to a determination that the bus voltage exceeds the first threshold and an amount of change in the bus voltage per predetermined period of time is a positive value, or
    maintaining the frequency at a constant value over time in response to a determination that the bus voltage exceeds the first threshold and an amount of change in the bus voltage per predetermined period of time is zero or a negative value.

7. The motor control apparatus according to claim 1, wherein the determinator determines whether the applied voltage and the frequency satisfy the predetermined relationship by comparing relative magnitudes of the applied voltage and the frequency.

8. The motor control apparatus according to claim 1, wherein the voltage regulator increases the voltage applied to the induction motor while the frequency of the applied voltage is held constant.

9. The motor control apparatus according to claim 1, wherein the frequency regulator decreases the frequency of the applied voltage while the voltage applied to the induction motor is held constant.

10. The method for controlling a motor according to claim 5, wherein the determining whether the applied voltage and the frequency satisfy the predetermined relationship is performed by comparing relative magnitudes of the applied voltage and the frequency.

11. The method for controlling a motor according to claim 5, wherein the executing the voltage increase mode increases the voltage applied to the induction motor while the frequency of the applied voltage is held constant.

12. The method for controlling a motor according to claim 5, wherein the executing the frequency decrease mode decreases the frequency of the applied voltage while the voltage applied to the induction motor is held constant.

13. The motor control apparatus according to claim 6, wherein the determinator determines whether the applied voltage and the frequency satisfy the predetermined relationship by comparing relative magnitudes of the applied voltage and the frequency.

14. The motor control apparatus according to claim 6, wherein the voltage regulator increases the voltage applied to the induction motor while the frequency of the applied voltage is held constant.

15. The motor control apparatus according to claim 6, wherein the frequency regulator decreases the frequency of the applied voltage while the voltage applied to the induction motor is held constant.

16. The motor control apparatus according to claim 8, wherein the frequency regulator decreases the frequency of the applied voltage while the voltage applied to the induction motor is held constant.

17. The method for controlling a motor according to claim 11, wherein the executing the frequency decrease mode decreases the frequency of the applied voltage while the voltage applied to the induction motor is held constant.

18. The motor control apparatus according to claim 14, wherein the frequency regulating means decreases the frequency of the applied voltage while the voltage applied to the induction motor is held constant.

19. The motor control apparatus according to claim 1, further comprising a voltage determinator configured to:
  perform the determination that the bus voltage exceeds the first threshold and an amount of change in the bus voltage per predetermined period of time is a positive value and output a result of the determination to the frequency regulator, or
  perform the determination that the bus voltage exceeds the first threshold and an amount of change in the bus voltage per predetermined period of time is zero or a negative value and output a result of the determination to the frequency regulator.

* * * * *